United States Patent
Xiao et al.

(10) Patent No.: US 9,605,102 B2
(45) Date of Patent: Mar. 28, 2017

(54) ASYMMETRIC REGIO-REGULAR CONJUGATED POLYMERS FOR ELECTRONIC APPLICATIONS

(71) Applicant: 1-Material Inc, Dorval (CA)

(72) Inventors: Steven Shuyong Xiao, St-Laurent (CA); Yali Yang, Pointe-Claire (CA)

( * ) Notice: Subject to any disclaimer, the term of this patent is extended or adjusted under 35 U.S.C. 154(b) by 0 days.

(21) Appl. No.: 14/755,067

(22) Filed: Jun. 30, 2015

(65) Prior Publication Data

US 2017/0002125 A1    Jan. 5, 2017

(51) Int. Cl.
   C08G 75/00    (2006.01)
   C08F 228/06   (2006.01)
   C08J 5/18     (2006.01)

(52) U.S. Cl.
   CPC .............. *C08F 228/06* (2013.01); *C08J 5/18* (2013.01); *C08J 2341/00* (2013.01)

(58) Field of Classification Search
   CPC . H01L 54/0069; H01L 54/0074; C08G 75/32; C08G 2261/3243; C08G 2261/91; C08G 2261/124; C08G 2261/414; C08G 2261/95; C08G 2261/3246; C07D 417/14
   See application file for complete search history.

(56) References Cited

PUBLICATIONS

Albrecht et al., J. Am. Chem. Soc. 2012, 134, 14932-14944.*

* cited by examiner

*Primary Examiner* — Shane Fang (57) ABSTRACT

A polymer consisting of a regio-regular polymer backbone basing on asymmetric fluorine-substituted 2,1,3-benzothiadiazole units (FBT) having a Formula 1MP0:

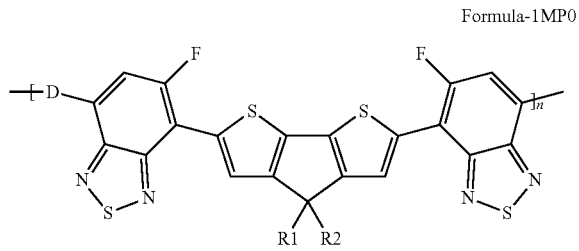

Formula-1MP0 where.
R1 is any alkyl group of 1-30 carbons;
R2 is any alkyl group of 1-30 carbons;
n is any number greater than 6;
D is an aryl moiety.

1 Claim, 5 Drawing Sheets

Reaction pathway to 1MP2

ASYMMETRIC REGIO-REGULAR CONJUGATED POLYMERS FOR ELECTRONIC APPLICATIONS

TECHNICAL FIELD

This invention relates to the field of asymmetric regio-regular conjugated polymers and their use in electronic-optical and electronic devices. More particularly, this invention relates to regio-regular conjugated semiconducting polymers containing asymmetric fluorine substituted (2,1,3)-benzothiadiazole in backbone. The invented asymmetric regio-regular conjugated polymers are soluble in common organic solvents for printing thin film devices such as organic photovoltaic devices (OPV), organic photo detectors, organic thin film transistors (OTFT) and organic sensors.

BACKGROUND

Conjugated polymers consist at least of one backbone chain of alternating double and single bonds. The π-electrons in conjugated polymers are delocalized and can be easier moved from one bond to the other, what makes such conjugated polymers to be a kind of organic semiconductors, thus referred as semiconducting polymers as well.

Generally, semiconducting polymers are created via cross-coupling condensation reactions with symmetrical monomer units that produce linear polymer backbone configurations. When symmetric monomer units are involved, various regiochemistries between adjacent structural units along the backbone vector can be created. As an example. Scheme-1 demonstrates the possible polymer chain configurations can be generated from monomer 3-hexylthiophene. The electronic properties such as charge mobility in organic thin film transistor (OTFT) and power conversion efficiency (PCE) in organic photovolatic (OPV) devices have been shown to be strongly dependent on the configuration of polymer backbone. Higher performance has been generally observed for these polymers with higher regioregularity. A high regioregularity means a high degree of heat-to-tail (HT) coupling and a low amount of head-to-head (HH) coupling or tail-to-tail coupling (TT) coupling as illustrated in Scheme-1.

Schme-1: Example of polymeric configuration of P3HT

It is still a technical challenge to synthesize a conjugated polymer with a controllable regio-regularity from asymmetric monomer units, and in most cases, the yielded polymer is often a random mixture of variety configurations including HT-HT, HT-HH, TT-HT and TT-HH as illustrated in Scheme-1, therefore the resulted polymer is referred as regio-random. Techniques to increase population of HT configuration, i.e. to increase regio-regularity of the resulted polymers, have been increasingly explored such as these disclosed in WO2005/014691, WO2006/107740, WO2007/146074, WO2008/092490 and WO2009/056490 for examples.

Furthermore, to achieve the desired energy-gap, HOMO/LUMO levels, absorption spectra, charge mobility and film morphology of conjugated polymers, the "donor-acceptor" (D-A) motif has been now widely adapted in designing conjugated polymers; where the donor (D) is an electron-rich monomer unit and the acceptor (A) is an electron-deficient monomer unit. A D-A polymer is a co-polymer that consists of alternating donor (D) units and acceptor (A) units. The "push-pull" behavior between donor unit and acceptor unit generally lowers the copolymer band gap and improves the double-bond character between repeating units.

One of most studied acceptors is 2,1,3-benzothiadiazole (BT). The introduction of one electron withdrawing atom, fluorine into the 2,1,3-benzothiadiazole (BT) results in a fluorine-substituted 2,1,3-benzothiadiazole (FBT), which is asymmetric in nature as illustrated in Formula-FBT.

Formula-FBT

Similar to homo-polymers like P3HT described previously, a D-A copolymer may be resulted in many varieties of polymeric backbone configurations if either or both of the donor unit and the acceptor unit are chemically asymmetric. Scheme-2 presents an example in a case that the acceptor unit is chemically asymmetric such as FBT, where D stands for a donor unit.

Under traditional cross-coupling condensation reactions between symmetric donor (D) units and asymmetric acceptors (A), the yielded co-polymer would be a mixture of many architectures, i.e. a random co-polymer. It is postulated that producing asymmetry in the polymer backbone could have a significant effect and even slight modifications of the chemical architecture of a conjugated polymer, i.e., single atom substitution and alkyl side chain length, can lead significant changes of copolymer's microstructure and ultimately electronic properties (Chen, H.-Y., etal., Adv. Mater. 2010, 22, 371). Indeed recently, Albrecht etal., (JACS, 2012, 134, 14932), Chen etal., (Nat. Photonics, 2009, 3, 649) and Tseng etal., (Nano Lett. 2012, 12, 6353) reported that semiconducting polymers containing asymmetric units exhibited higher performance in opto-electronic applications.

Evidently, it is now demanded to invent asymmetric conjugated "D-A" copolymers with controlled chemical architecture (regio-regularity) in order to achieve the desired energy-gap, HOMO/LUMO levels, absorption spectra, charge mobility and film morphology, ultimately to yield the desired performances for the targeted opto-electronic applications.

Equally importantly, it is desired to develop the synthetic pathway to reproduce these invented asymmetric conjugated "D-A" copolymers constantly.

SUMMARY OF THE INVENTION

Accordingly, it is an object of the invention to provide a new composition of matter with a regio-regular polymer backbone containing asymmetric fluorine-substituted 2,1,3-benzothiadiazole (FBT) units as schematically illustrated in Formula 1MP0:

Schme-2: Example of polymeric configurations containing FBT units

Formula-1MP0

In the above Formula-1MP0,
R1 is any alkyl group of 1-30 carbons;
R2 is any alkyl group of 1-30 carbons;
n is any number greater than 6;
D is an aryl moiety working as an electronic donor.

It is another object of the invention to provide a process for the synthesis of semiconducting polymers of 1MP0, which is reproducible and scalable.

It is another object of the invention to provide shaped articles such as fibers, tapes, films, and the like from solution processing of polymers of 1MP0.

It is another object of the invention to provide shaped articles as above described which are electrically semiconductive.

It is another object of the invention to provide a new composition of matter basing polymers of 1MP0, which are readily soluble in a variety of common organic solvents.

It is another object of the invention to provide a new composition of matter basing on polymers of 1MP0, which can readily form the desirable thin film from their solutions.

It is another object of the invention to provide a new composition of matter basing on polymers of 1MP0, which exhibit increased charge mobility and stability when they are used in fabricating organic thin film transistors.

It is another object of the invention to provide a new composition of matter basing on polymers of 1MP0, which exhibit increased solar conversion efficiency when they are used in fabricating organic photovoltaic devices.

DETAILED DESCRIPTION OF THE INVENTION

The polymer of the invention is of a regio-regular polymer backbone basing on asymmetric fluorine-substituted 2,1,3-benzothiadiazole units (FBT) as schematically illustrated in Formula 1MP0:

Formula-1MP0

In the above Formula-1MP0.
R1 is any alkyl group of 1-30 carbons;
R2 is any alkyl group of 1-30 carbons;
n is any number greater than 6;
D is an aryl moiety.

D is an aryl moiety, and preferably D is an electron-rich aromatic units which can work as an electronic donor when coupling with the asymmetric fluorine-substituted 2,1,3-benzothiadiazole unit (FBT) as illustrated in Formula-1MP0. Such a D can be selected from substituted or unsubstituted aryl or heteroaryl groups, such as $C_6$-$C_{30}$ substituted or unsubstituted aryl or heteroaryl groups. Examples of such groups include, but are not limited to, thiophene, pyrrole, furan, phenyl, phosphole, benzodithiophene, spirofluorene, spirothiophene, bithiophene, terthiophene, thienothiophene, dithienothiophene, benzothiophene, isobenzothiophene, benzodithiophene, cyclopentadithiophene, silacyclopentadiene, silacyclopentadienebithiophene, indole, benzene, naphthalene, anthracene, perylene, indene, fluorene, pyrene, azulene, pyridine, oxazole, thiazole, thiazine, pyrimidine, pyrazine, imidazole, benzoxazole, benzoxadiazole, benzothiazole, benzimidazole, benzofuran, isobenzofuran, thiadiazole, dithienopyrrole, dithieno phosphole and carbazole.

In one embodiment, the D moiety is cyclopenta[2.1-b:3,4-b']dithiophene (CDT), thus the Formula 1MP0 yields a specific class of polymers with a specific Formula-1MP1.

Formula-1MP1

In the above Formula-1MP1,
R1 is any alkyl group of 1-30 carbons;
R2 is any alkyl group of 1-30 carbons;
R3 is any alkyl group of 1-30 carbons;
R4 is any alkyl group of 1-30 carbons;
n is any number greater than 6;

In Formula 1MP1, each of R1, R2, R3 and R4 is independently selected from an alkyl group of 1-30 carbons. Examples of such alkyl groups include, but are not limited to, methyl, ethyl, propyl, butyl, pentyl, hexyl, heptyl, octyl, nonyl, decyl, undecyl, dodecyl, hexadecyl, ocosyl, triacontyl, iso-propyl, iso-butyl, 2-ethylhexyl, 2-butylhexyl, 2-butyloctyl, 2-hexyloctyl, 2-hexyldecyl, 2-hexyldodecyl, 2-octyldecyl, 2-octyldodecyl, 2-octyltetradecyl, 2-octylhexadecyl, 2-decyldodecyl, 2-decyltetradecyl, 2-decylhexadecyl, 2-dodecyltetradecyl, 2-dodecylhexadecyl, 2-dodecyloctadecyl.

In one embodiment, R1, R2, R3 and R4 are the same alkyl group of hexadecyl, thus the Formula 1MP1 yields a specific polymer, 1MP2 as illustrated in structure below.

1MP2

In terms of chemical configuration, 1MP2 is distinguished from its isomers 1MP2-X and 1MP2-Y as depicted in Scheme-3 because of the asymmetric nature of fluorine-substituted 2,1,3-benzothiadiazole unit (FBT).

Figure 1:
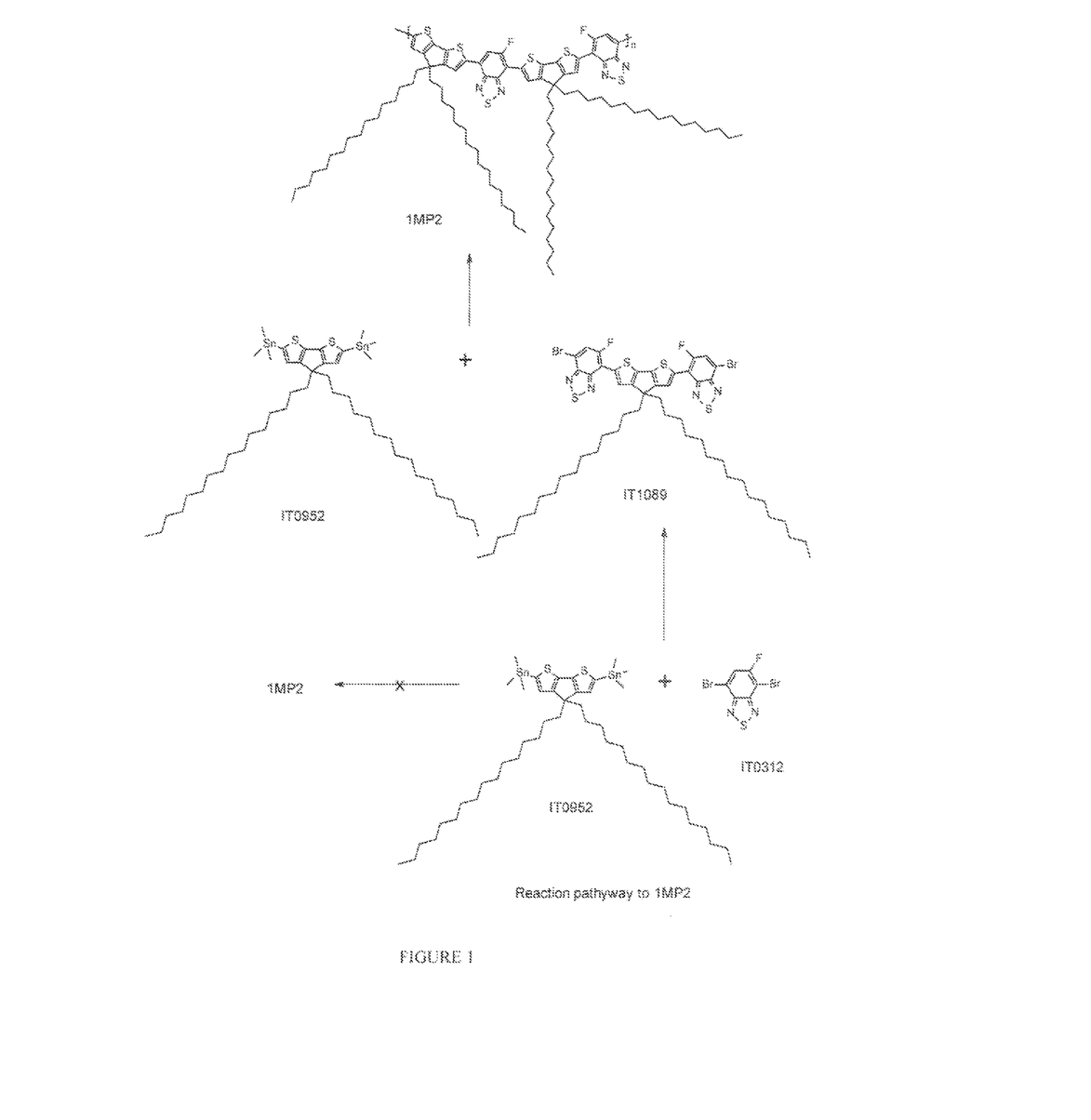
FIG. 1 is a graphic presentation of synthetic pathway for the invented semiconducting polymer 1MP2.

As shown in FIG. 1, such a regio-regular polymer with defined architecture, 1MP2 for example, can't be simply prepared by poly-condensation of the donor units (IT0952) and the asymmetric acceptors fluorine-substituted 2,1,3-benzothiadiazole unit (FBT, refereed as IT0312 in FIG. 1), where a mixture of all kinds of isomers would be generated as illustrated in Scheme-3.

Scheme-3: 1MP2 and its possible isomers

1MP2

1MP2-X

1MP2-Y

Therefore, it is another objective of this invention to teach the synthetic pathway to prepare regio-regular asymmetric conjugated polymers in a controllable manner. According to this invention, the desirable asymmetric configuration is pre-assembled before poly-condensation.

For instance, an asymmetric acceptor unit of IT1089 was first prepared before coupling with the donor unit of IT0952. As such, the desirable regio-regular asymmetric conjugated polymers manner can be prepared in a controllable, and the resulted polymers are novel with desirable properties.

Overall, the polymers of Formula 1MP0 are the novel compounds which have a polymeric backbone containing a pre-assembled asymmetric unit of Formula-2FBT-CDT.

Formula-2FBT-CDT

It is the polymeric backbone consisting of a pre-assembled asymmetric unit of Formula-2FBT-CDT which renders the polymer 1MP0 shown above a new composition of matter. The pre-assembled asymmetric unit of Formula- 2FBT-CDT in the invented polymers offers the desirable LUMO and HOMO energy levels, the energy gap, and also the absorption spectra.

It is also the designed alkyl groups on the CDT unit which render the polymer 1MP0 shown above a new composition of matter. Such alkyl groups offers the desirable solubility in common organic solvents in order to make a thin film from its solution and also render the formed film to have optimal morphology, thus yields a higher charge mobility as well.

The novel semiconducting polymer of formula 1MP0 can be synthesized by a convenient poly-condensation methods know to these skilled in the art, but the asymmetric unit of Formula-2FBT-CDT needs to be pre-assembled. For example, FIG. 1 illustrates a conventional Stille Coupling method to make 1MP2, one sample polymer of this invention.

In the example which follows, the specific preparation of 1MP2 by Stille Coupling reaction (FIG. 1) and the application of this semiconducting polymer in making a polymer thin film transistor and polymer solar cell are given. It should be understood that the preparation steps are exemplary and are not intended to constitute a limitation of the invention.

EXAMPLE 1

Preparation of the Asymmetric Acceptor Unit of IT1089 (an Example of 2FBT-CDT)

IT1089, an asymmetric 2FBT-CDT intermediate, was prepared following a reaction scheme as illustrated in FIG. 1. Into a 500 mL flask. 6.15 g (6.46 mmol) of IT0952 (commercially available from I-Material Inc. Canada), 4.03 g (12.9 mmol) of IT0312 (commercially available from 1-Material Inc, Canada), 150 mL of toluene was charged under argon to give a uniform solution. The obtained solution was bubbled with argon for 30 minutes. Then the solution was added with 746 mg (0.6455 mmol) of $Pd(PPh_3)_4$ [tetra (tris(phenyl)phosphine]palladium and stirred at reflux for 24 hours. Then the flask was cooled to room temperature, evaporate the solvent, washed by methanol, filtered, the crude product was collected and then subjected to flush chromatography purification using chloroform and hexane (2:1) as the eluent to yield 3.08 g of pure intermediate IT1089 (yield=44%.)

Figure 2:
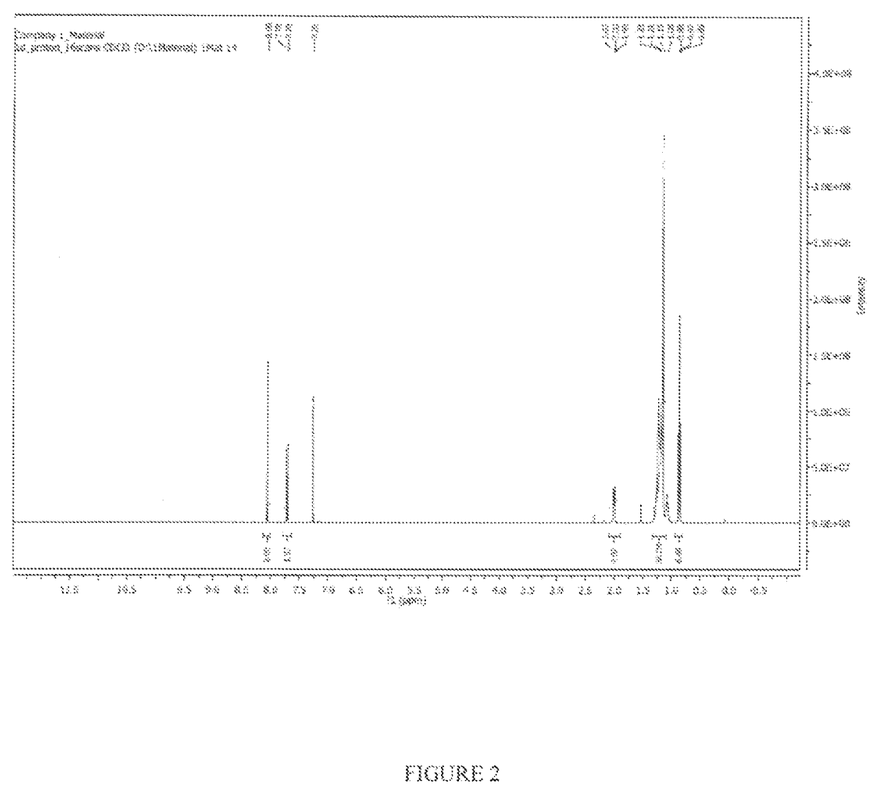
FIG. 2 presents NMR spectrum of the asymmetric intermediate IT1089(2F-BT)

FIG. 2 presents the NMR spectrum of IT1089 obtained, and analysis of this spectrum yielded the following: $^1$H NMR ($CDCl_3$): δ (ppm): 0.87 (t, 6H), 1.15-1.23 (m, 56H), 2.0 (m, 4H), 7.70 (d, 2H), 8.06 (s, 2H).

EXAMPLE 2

Preparation of an Asymmetric Regio-Regular Conjugated Polymer (1MP2)

As an example, a symmetric regio-regular conjugated polymer, 1MP2 was prepared following a reaction scheme as illustrated in FIG. 1. Into a 250 mL flask, 1.75 g (1.84 mmol) of IT0952 (commercially available from 1-Material Inc, Canada), 2.00 g (1.84 mmol) of IT1089 prepared in EXAMPLE 1, 50 mL of m-xylene was charged under argon to give a uniform solution. The obtained solution was bubbled with argon for 30 minutes. Then the solution was added with 106 mg (0.0918 mmol) of $Pd(PPh_3)_4$ [tetra (tris(phenyl)phosphine]palladium and stirred at reflux for 48 hours. Then the reaction was end-capped with 1 mL of phenylbromide, and further stirred for 5 hours. After the flask was cooled to room temperature, the reaction liquid was poured into 1000 mL of methanol. The precipitate polymer was collected by filtration to give 2.5 g of bluish black particles as the crude polymer. The crude polymer was subjected to soxhlet extraction in a sequence of acetone, hexane and chloroform. The chloroform extraction was concentrated and the concentrated chloroform extraction was poured into acetone to make polymer precipitate again. The precipitated polymer was collected again by filtration and dried under vacuum to yield 0.7 g of purified polymer as a shine purplish-black solid, referred as 1MP2 in this invention.

GPC (Eluted in $CHCl_3$, Polystyrene as standard) analysis of 1MP2 yielded the following: Mw=120000, Mn=5000 and PDI=2.4.

EXAMPLE 3

Typical Characters of 1MP2

The polymer obtained in EXAMPLE 2 was found to be fully soluble in common organic solvents. The solvents examined include chloroform, tetrahydrofuran (THF), chlorobenezene, ortho-dichlorobenzene, dimethyl glutarate and dimethyl succinate. For example, 2% wt/vol solution of 1MP2 in chlorobenzene was readily made by dissolving the polymer prepared in EXAMPLE-2 at room temperature. The 1MP2 solutions are dark purple colored.

The thin film of 1MP2 can be formed by drop casting or by spin casting from 1MP2 solution, which yielded an uniform film of metallic shined blue-purple color. Films can also be readily formed on other substrates, such as quartz, silicon wafer, PET, and ITO (indium-tin oxide coated glass).

Figure 3:
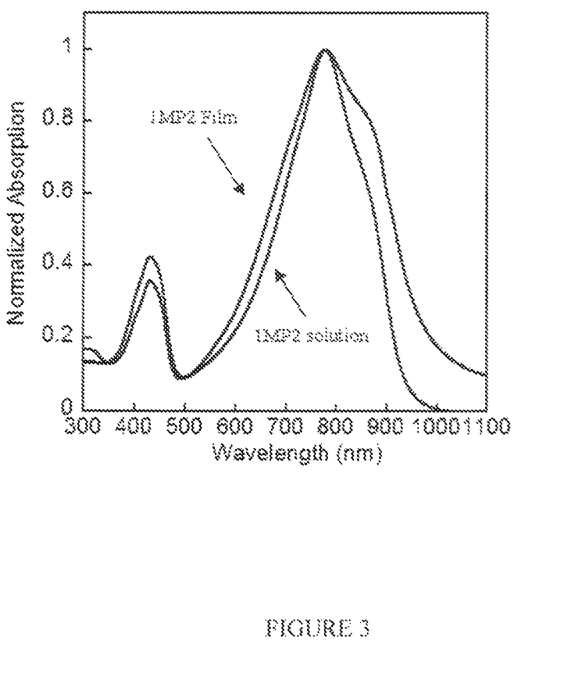
FIG. 3 presents absorption spectra of the invented semiconducting polymer 1MP2 both in solution and in film state.

FIG. 3 presents absorption spectra of both 1MP2 solution and 1MP2 film on glass, and both spectra exhibited a broad and strong absorption in near infrared region.

Figure 4:
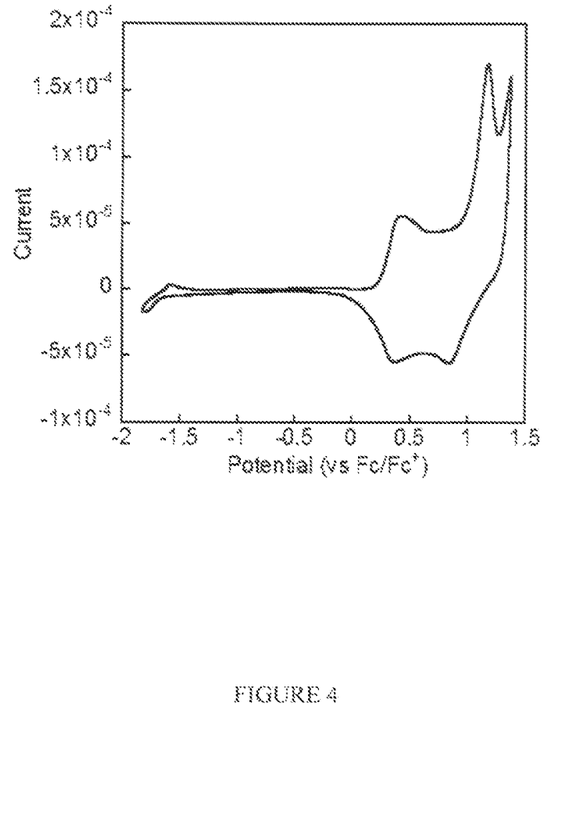
FIG. 4 presents a typical cyclic voltammogram (CV) of the invented semiconducting polymer 1MP2 in solution.
Figure 5:
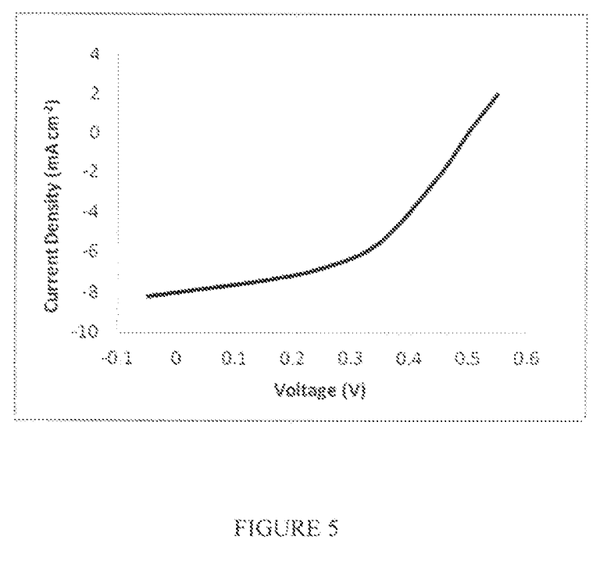
FIG. 5 presents a graph of the current-voltage characteristics of an OPV device made with the invented semiconducting polymer 1MP2.

FIG. 4 presents a typical cyclic voltammogram (CV) of 1MP2 solution. From FIG. 3 and FIG. 4, it has been estimated that the invented polymer 1MP2 has a energy gap (Eg) of 1.24 eV, high occupied molecular orbit (HOMO) of −4.98 eV, and lowest unoccupied molecular orbit (LUMO) of −3.74 eV. These data demonstrates typical characters of a semiconducting material.

EXAMPLE 5

Application of 1MP2 in OPV

In this example, the electron acceptor $PC_{71}BM$ and the cathode interface material poly [(9,9-bis(3'-(N,N-dimethylamino)propyl)-2,7-fluorene)-alt-2,7-(9,9-dioctylfluorene)] (PFN) are commercially available from I-Material Inc. The polymer 1MP2 prepared in EXAMPLE 2 and $PC_{71}BM$ in the weight ratio of 1:1.5 were co-dissolved in a solvent mixture of 97% (vol/vol) chlorobenzene and 3% (vol/vol) 1,8-diiodooctane with a concentrations of 10 mg/ml of polymer and 15 mg/ml of $PC_{71}BM$ respectively. The poly (3,4-ethylenedioxythiopene):poly-(styrenesulfonate) (PEDOT:PSS, Clevios P A14083) used was obtained from H.C. Starck Clevios GmbH.

An invert OPV device was fabricated with a device structure of ITO/PFN/1MP2: $PC_{71}BM/MoO_3/Al$, as described in Reference (Zhicai He, et al., Nature Photonics. 9, 174(2015)). Before the deposition of the photoactive layer, PFN thin layer was coated at the top of the precleaned ITO substrate (treated by oxygen plasma cleaning for 4 mins) by spin casting from the methanol solution at 2000 r.p.m. for 1 min, forming a thin interlayer with an initial thickness of 10 nm. The thickness of the interlayer was determined by a surface profiler (Alfa Step-500, Tencor), in conjunction with extrapolation from an absorbance-thickness curve that assumes a linear dependence of absorbance at 380 nm on film thickness. The PFN solution was prepared by dissolving the solid in methanol (anhydrous grade, 99.8%) under the presence of small amount of acetic acid (~2-20 μl/ml depending on molecular weight of PFN). The typical concentration of PFN solution for spin-coating is 2 me/ml. Following the deposition of PFN interlayer, the 1MP2:PC$_{71}$BM active blend layer, with nominal thickness around 100 nm, was prepared by spin-coating the mixed solvent of chlorobenzene/1,8-diiodoctane (97%:3% by volume) solution (with a total concentration of 25 me/ml, as described previously) at 1000 r.p.m. for 2 min. The resulted photoactive layer was dried in vacuum for 3 hours before electrode deposition. A 10 nm MoO$_3$ layer and a 100 nm Al layer were subsequently were evaporated through a shadow mask to define the active area of the devices (~2×8 mm$^2$) and form top anode.

The fabricated device was encapsulated in a nitrogen filled glove box by UV epoxy and cover glass. The current density-voltage (J-V) curves were measured using Keithley 2400 source-measure unit. The photocurrent was measured under AM 1.5 G illumination at 100 mW/cm$^2$ under a solar simulator. The light intensity was determined by a monosilicon detector calibrated by National Renewable Energy Laboratory (NREL).

FIG. 4 is a graph of the current-voltage characteristics of a device made with a semiconducting polymer prepared as described herein. From this graph, it was calculated that: Voc (V)=0.5; Jsc (mA/cm$^2$)=7.79; FF (%)=0.497, and to yield an overall PCE (%)=1.94.

EXAMPLE 5

Application of 1MP2 in OTFT

The polymeric thin film transistor with high orientation was fabricated following the reported procedure (Chan Luo, et al., Nano Lett., 2014, 14, 2764-2771). TFT mobility was derived from the saturated operation regime by using the formula-OTFT:

$$I_{DS}=(W/2L)C_\mu h(V_{GS}-V_{TH})^2 \qquad \text{Formula-OTFT:}$$

where W/L is the channel width/length, C is the capacitance of dielectric layer per unit area were measured for the native substrate and the substrate with nano-grooves (10.0 nFcm$^{-2}$ and 11.5 nF cm$^{-2}$), respectively. V$_{GS}$ and V$_{TH}$ are the gate-source voltage and the threshold voltage, respectively.

Using the formula-OTFT, the charge mobility was calculated under different electric field (V$_{DS}$) and listed in Table-1. Remarkably, a high charge mobility of 100(cm2V$^{-1}$S$^{-1}$) was approached with the increase of electric field. This is the highest charge mobility for a polymeric material ever reported.

TABLE 1

Charge mobility of 1MP2 under different V$_{DS}$

| V$_{DS}$(V) | 0.5 | 1 | 2 | 5 | 10 | 20 | 40 | 80 | 120 |
|---|---|---|---|---|---|---|---|---|---|
| Mobility (cm2V$^{-1}$ S$^{-1}$) | 0.4 | 1.2 | 2.7 | 8.1 | 18.9 | 39.3 | 64.3 | 78.5 | 93.1 |

It is now understood that various modifications of the invention are contemplated and can be resorted to those skilled in the art without departing from the spirit and scope of the invention as defined in the following claims.

REFERENCE CITED

Patent Documents

WO 2005/014691 A2, 02/2005 Koller, et al
WO 2006/107740 A2, 10/2006 Mccullough, et al
WO 2007/146074 A1, 12/2007 Rieke, et al
WO 2008/092490 A1, 08/2008 Hoffart, et al
WO 2009/056496 A1, 05/2009 Rieke, et al Non Patent Documents He, Z. C, et al. Nature Photonics, 9, 174 (2015)
Chen, H. Y., et al., Adv. Mater., 22, 371(2010)
Albercht., et al., JACS, 134, 14932(2012)
Chen., et al., Nature Photonics, 3, 649(2009)
Tseng, et al., Nano Lett., 12, 6353(2012)
Luo, C, et al., Nano Lett., 14, 2764(2014)

We claim:

1. A polymer having a defined structure of Formula 1MP2 where n is any number greater than 6.

* * * * *

UNITED STATES PATENT AND TRADEMARK OFFICE
CERTIFICATE OF CORRECTION

PATENT NO. : 9,605,102 B2  
APPLICATION NO. : 14/755067  
DATED : March 28, 2017  
INVENTOR(S) : Steven Shuyong Xiao et al.

Page 1 of 1

It is certified that error appears in the above-identified patent and that said Letters Patent is hereby corrected as shown below:

On the Title Page

Column 1 under item (72) Inventors, please insert --Guillermo C. Bazan, Santa Barbara CA (US); and Lei Ying, Goleta CA (US)-- after Yali Yang, Pointe-Claire CA (US).

Signed and Sealed this
Twelfth Day of June, 2018

Andrei Iancu
*Director of the United States Patent and Trademark Office*